(12) United States Patent
Iwashita et al.

(10) Patent No.: US 6,741,776 B2
(45) Date of Patent: May 25, 2004

(54) OPTICAL WAVEGUIDE MODULE OPTICALLY CONNECTED WITH AN OPTICAL FIBER

(75) Inventors: Katsuhiko Iwashita, Tokyo (JP); Tomohiro Watanabe, Tokyo (JP); Toshihiko Ota, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 149 days.

(21) Appl. No.: 09/884,152

(22) Filed: Jun. 20, 2001

(65) Prior Publication Data

US 2001/0055446 A1 Dec. 27, 2001

(30) Foreign Application Priority Data

Jun. 26, 2000 (JP) ........................................ 2000-191262

(51) Int. Cl.[7] .................................................. G02B 6/30
(52) U.S. Cl. .............................. 385/49; 385/14; 385/50; 385/52; 385/88; 385/89; 385/90
(58) Field of Search ................................ 385/14, 49–56, 385/59, 60, 62, 65, 67, 71, 76, 77, 81, 88–92, 129–131, 85, 136, 137, 139

(56) References Cited

U.S. PATENT DOCUMENTS

| | | | | |
|---|---|---|---|---|
| 5,235,658 A | * | 8/1993 | Dragone et al. | 385/50 |
| 5,416,881 A | * | 5/1995 | Ikeda | 385/135 |
| 5,463,708 A | * | 10/1995 | Yui et al. | 385/49 |
| 5,513,290 A | * | 4/1996 | Ishikawa et al. | 385/49 |
| 5,566,262 A | * | 10/1996 | Yamane et al. | 385/33 |
| 5,625,730 A | * | 4/1997 | Ishikawa et al. | 385/49 |
| 5,706,378 A | * | 1/1998 | Suzuki et al. | 385/49 |
| 5,708,741 A | * | 1/1998 | DeVeau | 385/49 |
| 6,181,856 B1 | * | 1/2001 | Brun | 385/52 |
| 6,226,429 B1 | * | 5/2001 | Hikita et al. | 385/50 |
| 6,238,100 B1 | * | 5/2001 | Sasaki et al. | 385/59 |
| 6,257,769 B1 | * | 7/2001 | Watanabe et al. | 385/53 |
| 6,257,770 B1 | * | 7/2001 | Sato | 385/78 |
| 6,496,624 B1 | * | 12/2002 | Hikita et al. | 385/50 |

FOREIGN PATENT DOCUMENTS

| | | | | | |
|---|---|---|---|---|---|
| JP | 05196838 A | * | 8/1993 | | G02B/6/30 |
| JP | 08-248269 | | 9/1996 | | |
| JP | 09090157 A | * | 4/1997 | | G02B/6/30 |

* cited by examiner

Primary Examiner—Brian Healey
Assistant Examiner—Daniel Petkovsek
(74) Attorney, Agent, or Firm—Oblon, Spivak, McClelland, Maier & Neustadt, P.C.

(57) ABSTRACT

An optical waveguide module is provided, which comprises an optical waveguide component having an auxiliary connection member connected to an end of an optical waveguide chip and at least one array member for attaching an end of at least one optical fiber to a connection member to be connected to the auxiliary connection member. The optical waveguide component and the array member are connected to each other via the auxiliary connection member and the connection member. A presser member is disposed to press at least one of the optical waveguide chip and the optical fiber in the direction of the connection. An optical waveguide exposed from the end of the optical waveguide chip is in direct contact with the core of the optical fiber exposed from an end of the array member.

17 Claims, 13 Drawing Sheets

OPTICAL WAVEGUIDE MODULE OPTICALLY CONNECTED WITH AN OPTICAL FIBER

FIELD OF THE INVENTION

The present invention relates to an optical waveguide module.

BACKGROUND OF THE INVENTION

An optical waveguide component has a plurality of optical waveguides, integrated at high densities and formed in a desired pattern on a flat substrate. It is employed for various applications as a multi-purpose component for use in optical communications. Use of such an optical waveguide component inevitably requires a technique for connecting optical fibers to the optical waveguides. In this case, it is general practice to form an optical fiber array by arranging and fixing single or multi optical fibers at predetermined intervals and to join the optical fiber array and the optical waveguide together with their side faces abutting on each other. Then, the optical fiber array is aligned with the optical waveguides in small increments while the power of the light transmitted from the optical fibers is being monitored at the end of the optical waveguides to search for the maximum value of the power of the transmitted light. After the optical fiber has been aligned with its respective optical waveguide by searching for the peak power of the light, the optical fiber and its respective optical waveguide are fixedly bonded to each other at the butt-jointed point with an ultraviolet cure adhesive or the like.

Incidentally, in recent years, an unprecedented excitation light source for supplying power exceeding 300 mW has increasingly been required, such as in a long-distance optical transmission line, to excite an optical amplifier, such as an erbium-doped fiber amplifier or Raman amplifier. Available means for providing such high-power excitation light include an optical waveguide component for multiplexing beams of excitation light with each other. For example, available is an optical waveguide component that provides high-power excitation light by multiplexing, using a Mach-Zender interferometer (MZI), beams of light having a plurality of wavelengths within the wavelength band usable as excitation light.

With such an optical waveguide component being coupled with optical fibers, optical power exceeding 300 mW passes through an optical waveguide, especially at the high-power transmission end face from which beams of light having a plurality of wavelengths, multiplexed with each other, are transmitted.

Furthermore, with an increasing level of wavelength multiplexing in the wavelength division multiplexing (WDM) communications, communication light itself is expected to have a high power exceeding 300 mW. In this regard, the WDM system also requires a high-power optical wavelength multiplexing/demultiplexing module with a wavelength multiplexing/demultiplexing optical waveguide that employs an arrayed waveguide grating (AWG).

SUMMARY OF THE INVENTION

It is therefore an object of the present invention to provide an optical waveguide module which can maintain the reliability of the connection between the optical waveguide and the optical fiber even upon the transmission of high-power light, can be produced at low cost and provide improved resistance to environment, and is provided with optical waveguides integrated at high densities.

In order to achieve the aforementioned objective, an optical waveguide module, according to the present invention, comprises an optical waveguide component having an auxiliary connection member connected to an end of an optical waveguide chip, and at least one array member for attaching an end of at least one optical fiber to a connection member which is to be connected to the auxiliary connection member. The module is configured such that the optical waveguide component and the array member are connected to each other via the auxiliary connection member and the connection member. An optical waveguide, exposed from the end of the optical waveguide chip, is in direct contact with a core of the optical fiber exposed from an end of the array member.

Further, to achieve the aforementioned objective, an optical waveguide module, according to the present invention, comprises the following. An optical waveguide component having an auxiliary connection member connected to an end of an optical waveguide chip, and at least one array member for attaching an end of at least one optical fiber to a connection member to be connected to the auxiliary connection member. The module is configured such that the optical waveguide component and the array member are connected to each other via the auxiliary connection member and the connection member. A presser member is disposed to press at least one of the optical waveguide chips and the optical fiber in a direction of connection, and an optical waveguide exposed from the end of the optical waveguide chip is in direct contact with a core of the optical fiber exposed from an end of the array member.

Furthermore, to achieve the aforementioned objective, an optical waveguide module, according to the present invention, comprises a first array member with a plurality of optical fibers having ends attached to a first connection member, and a second array member with at least one optical fiber having an end attached to a second connection member. The module further comprises an optical waveguide chip having an input and output end face, and an optical waveguide for multiplexing a plurality of optical signals, which have different wavelengths inputted from a plurality of input ports to output a resulting optical signal from at least one output port. The module is configured such that the first array member is bonded with adhesive to the input end face of the optical waveguide chip; an auxiliary connection member is attached to the output end face of the optical waveguide chip; the second connection member is connected to the auxiliary connection member; and the second array member is coupled to the output end face of the optical waveguide chip via the second connection member and the auxiliary connection member. The module is further configured such that a presser member for pressing the auxiliary connection member and the second array member in a direction of connection is disposed across the auxiliary connection member and the second array member. A core of the optical waveguide exposed from the output end face of the optical waveguide chip is in direct contact with a core of the optical fiber exposed from an end of the second array member.

In this text, an auxiliary connection member means, a component to be attached to the end face of an optical waveguide chip. In addition, a connection member refers to a member, such as a substrate having a plurality of positioning grooves for positioning ferrule or optical fibers, which is used for the connection of optical fibers but has not yet been connected with an array of optical fibers. An array member refers to the aforementioned connection member, connected with an array of optical fibers, such as a connector plug or an optical fiber array.

These and other objects, features, and advantages of the present invention will become clear from the following description with reference to the accompanying drawings.

DETAILED DESCRIPTION

An optical waveguide module, according to the present invention, will be explained below in more detail with reference to FIGS. 1 to 23 in accordance with the embodiments.

Figure 1:
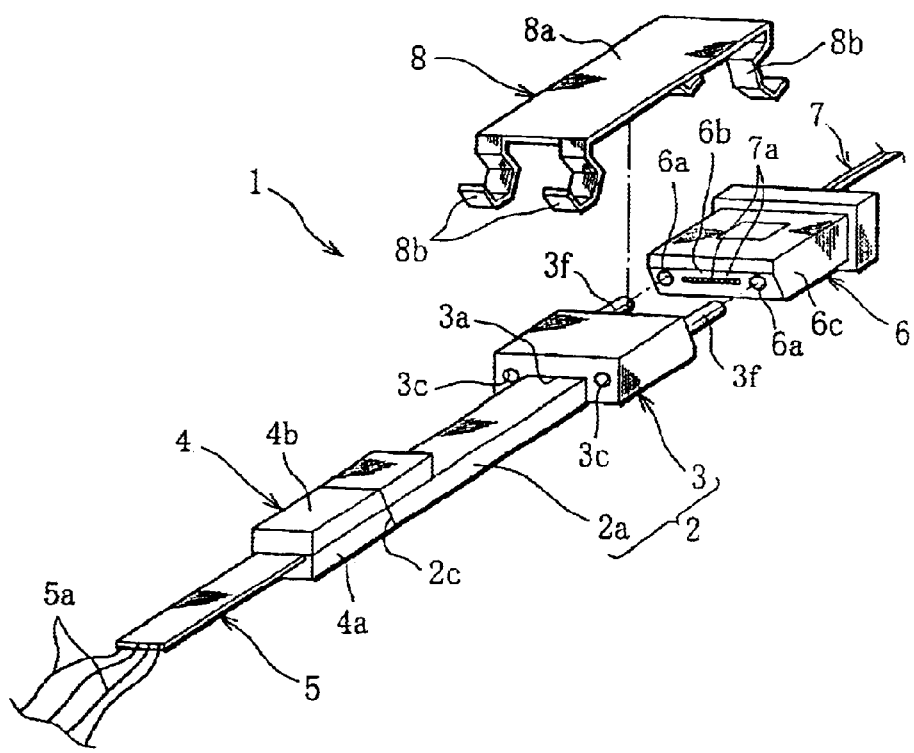
FIG. 1 is a perspective view illustrating an optical waveguide module according to an embodiment of the present invention.

An optical waveguide module 1 is an optical module which is used with a light source for exciting optical amplifiers such as an erbium-doped fiber amplifier or Raman amplifier. It multiplexes beams of light having different wavelengths and emitted from a plurality of light sources. As shown in FIG. 1, the optical waveguide module 1 comprises an optical waveguide component 2 having an auxiliary connection member 3 connected to an end of an optical waveguide chip 2a, a connector plug (hereinafter referred to simply as the "plug") 6 serving as an array member, and a clamp spring 8 serving as a presser member.

Figure 2A:
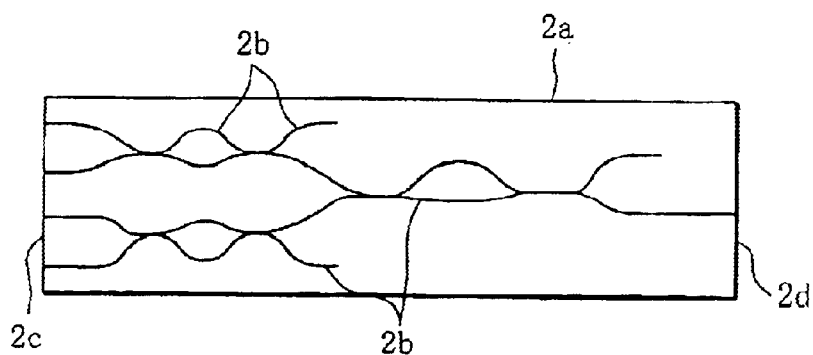
FIG. 2A is a plan view illustrating an optical waveguide chip for use with the optical waveguide module of FIG. 1.
Figure 2B:
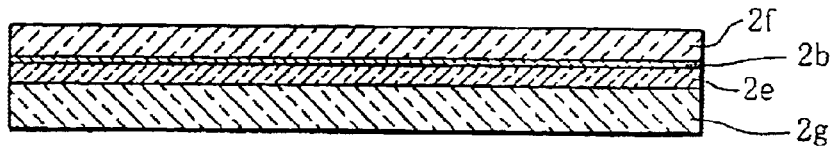
FIG. 2B is a cross-sectional view of FIG. 2A.

As shown in FIGS. 2A and 2B, the optical waveguide chip 2a has a structure in which a lower cladding layer 2e is formed on a substrate 2g, made of silicon or quartz, and optical waveguides 2b are integrally formed at high densities in a desired pattern on the lower cladding layer 2e. For example, the optical waveguide 2b is a Mach-Zender interferometer (MZI) having four input ports and one output port for multiplexing input beams of light having a plurality of wavelengths. The optical waveguide 2b can also demultiplex the light that is inputted in the opposite direction. As shown in FIG. 2A, the optical waveguide chip 2a has an input end face 2c and an output end face 2d.

Figure 11:
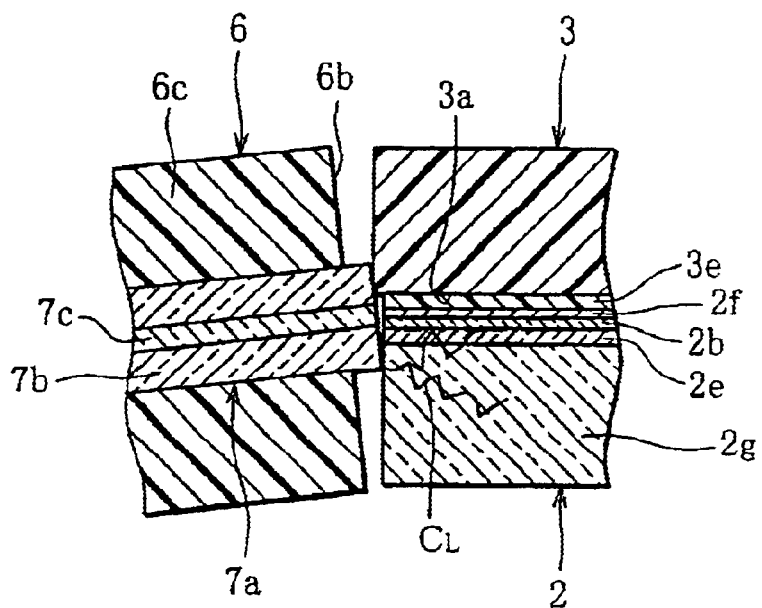
FIG. 11 is an explanatory cross-sectional view illustrating a drawback caused by a direct contact between the cores of an optical waveguide component and an optical fiber in the optical waveguide module shown in FIG. 9, where the tip of the optical fiber projecting from the plug has a cylindrical shape or and an excessively large outer diameter.
Figure 13:
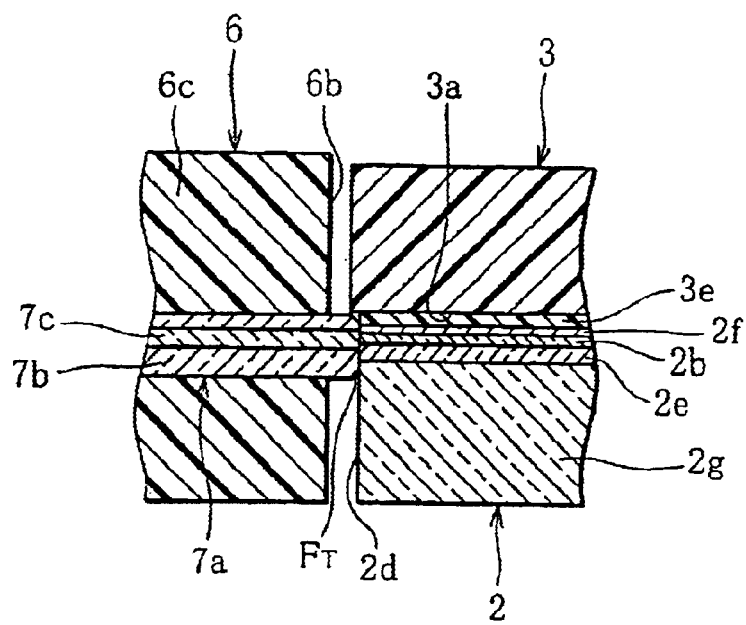
FIG. 13 is a cross-sectional view illustrating a direct contact between the cores of an optical waveguide component and an optical fiber in the optical waveguide module shown in FIG. 9, where the outer periphery of the clad of the optical fiber projecting from the plug has been ground and polished.

The optical waveguides 2b are formed in between the lower cladding layer 2e and an upper cladding layer 2f (see FIGS. 11 and 13). As shown in FIG. 1, the optical waveguide component 2 is adapted such that the auxiliary connection member 3 is fixedly bonded with adhesive to the upper surface of the optical waveguide component 2 at one end, or the output end face 2d. On the other hand, an optical fiber array 4 is fixedly bonded with adhesive to the upper surface of the optical waveguide component 2 on the side of the other end, or the input end face 2c. The optical waveguide component 2 also has V-grooves 2h (see FIG. 3A) formed on the upper surface on the side of the output end face 2d.

Figure 3A:
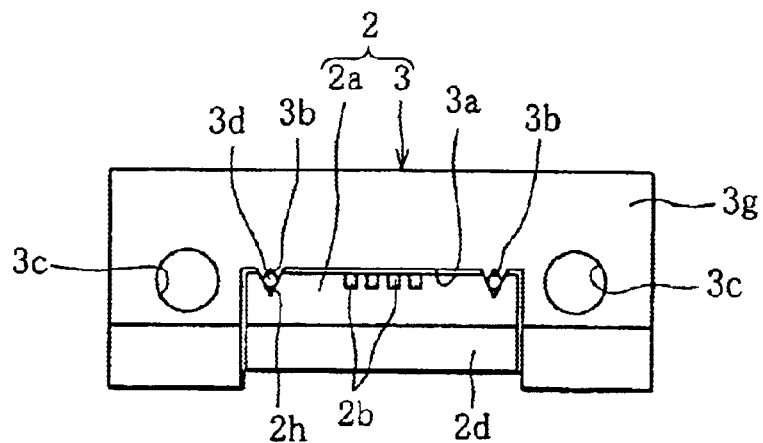
FIG. 3A is a front view illustrating the arrangement of an optical waveguide component and an auxiliary connection member for use with the optical waveguide module of FIG. 1.
Figure 3B:
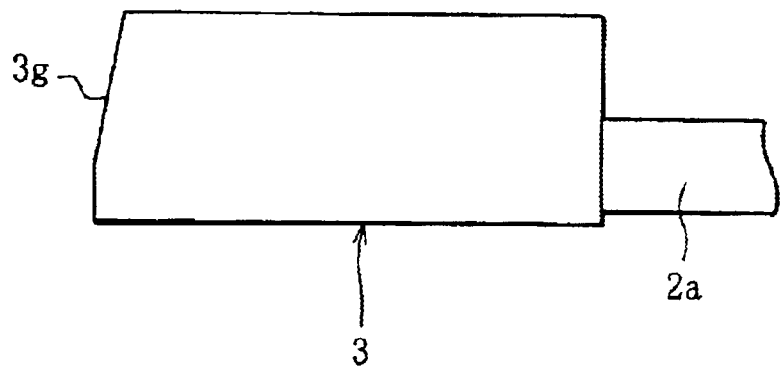
FIG. 3B is a side view of FIG. 3A.

In addition, as shown in FIGS. 3A and 3B, the optical waveguide component 2 is ground and polished such that the output end face 2d, as well as the end surface of the optical waveguides 2b, is oriented diagonally, for example, at an angle of eight degrees with respect to a perpendicular plane, orthogonal to the optical axis of the optical waveguides 2b. This inclination is provided to reduce the reflection on the output end face 2d of high-power light exceeding 300 mW that is transmitted through the optical waveguides 2b. This allows a semiconductor laser connected to optical fibers 5a, described later, to be protected from damage. If any other means are available to the optical waveguide component 2 to eliminate the effect of the reflection on the output end face 2d, the output end face 2d does not need to be ground and polished diagonally, but may be allowed to form a perpendicular plane, orthogonal to the optical axis. In this case, the plug 6 is also adapted such that a butt-joint end face 6b, described later, forms a perpendicular plane, orthogonal to the optical axis of optical fibers 7a.

The auxiliary connection member 3, molded of a synthetic resin such as an epoxy resin, is used to cover the upper surface of the optical waveguide component 2 on the side of the output end face 2d. As shown in FIGS. 3A and 3B, the auxiliary connection member 3 is provided in the middle lower part with a recessed part 3a for housing the optical waveguide chip 2a. In the recessed part 3a, there are formed two V-grooves 3b spaced laterally at a predetermined interval. In addition, the auxiliary connection member 3 is provided, at both lateral sides, with pinholes 3c.

Figure 4:
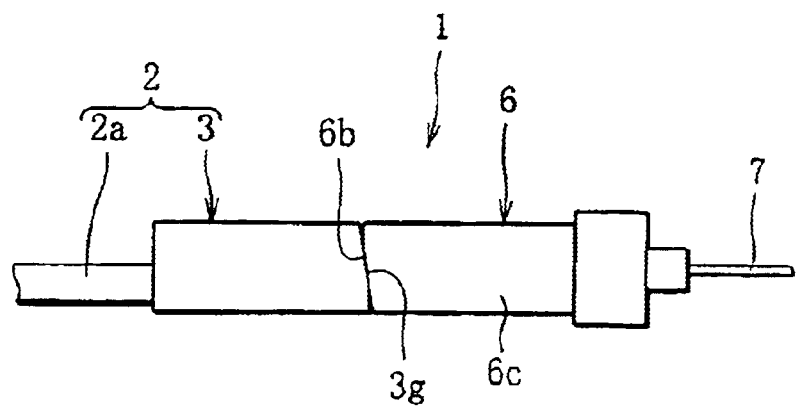
FIG. 4 is a side view illustrating an optical waveguide component and a plug butt-jointed to each other via an auxiliary connection member.

The auxiliary connection member 3 is positioned with respect to the optical waveguide chip 2a with an alignment pin 3d being interposed in between the V-grooves 3b and the V-grooves 2h and then bonded to the upper surface of the optical waveguide chip 2a on the side of the output end face 2d by means of an adhesive layer 3e (see FIGS. 11 and 13) of thickness 20 μm or less. This allows the relative position between the center of the pinholes 3c and the optical waveguide 2b of the optical waveguide component 2 to equal the relative position between the center of pinholes 6a of the plug 6, described later, and the core of the optical fibers 7a. Likewise, the auxiliary connection member 3 employs guide pins 3f, shown in FIG. 1, each inserted in the pinholes 3c, to allow the optical waveguide component 2 to be positioned with and butt-jointed to the plug 6 as shown in FIG. 4. The auxiliary connection member 3 also has a butt-joint end face 3g, opposite to the plug 6, to be ground and polished in conjunction with the output end face 2d.

The optical fiber array 4 is an array member, as shown in FIG. 1, which is attached to an end of a tape fiber 5. The optical fiber array 4 has a cover 4b and a substrate 4a, acting as a connection member and having a plurality of positioning grooves (not shown) formed thereon, which allows each of the optical fibers 5a of the tape fiber 5, described later, to be positioned in the aforementioned positioning grooves.

The tape fiber 5 has a plurality of first optical fibers, for example, four optical fibers 5a, allowing each end of the optical fibers 5a to be coupled to semiconductor lasers LD1 to LD4 (see FIG. 9) acting as a light source for emitting beams of light having different wavelengths. The tape fiber 5 has no particular limit to the number of optical fibers 5a.

The semiconductor lasers LD1 to LD4 have a maximum output of the order of 200 mW. As no possibility of being burned due to the laser light, the optical waveguide component 2 and the optical fiber array 4 are bonded to each other with an ordinary adhesive.

Figure 5A:
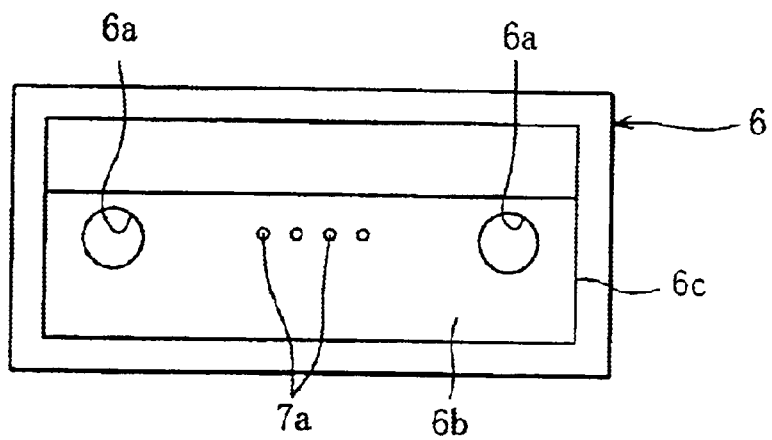
FIG. 5A is a front view illustrating a plug for use with the optical waveguide module of FIG. 1.
Figure 5B:
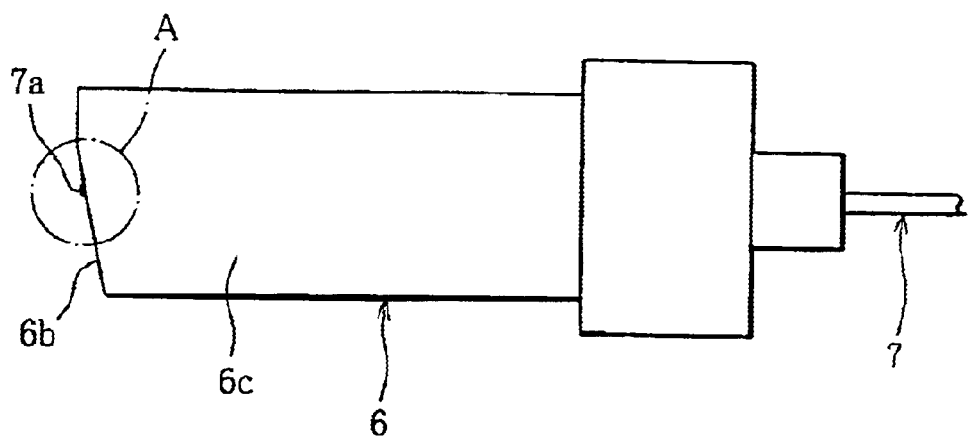
FIG. 5B is a side view of FIG. 5A.

The plug 6 is an array member employing a multi-fiber connector such as a ferrule 6c comprising a mechanically transferable connector (MT) molded of a synthetic resin. The ferrule is a connection member and may be a ferrule such as that used with a pin fitting multi-fiber connector, such as a so-called Mini-MT connector, as well as a single-fiber connector ferrule. As shown in FIGS. 1, 5A, and 5B, the plug 6 is adapted such that the ferrule 6c is attached to an end of a tape fiber 7 having a plurality of optical fibers 7a acting as the second optical fibers, and the pinholes 6a are formed on both lateral sides of the plug 6.

Figure 6:
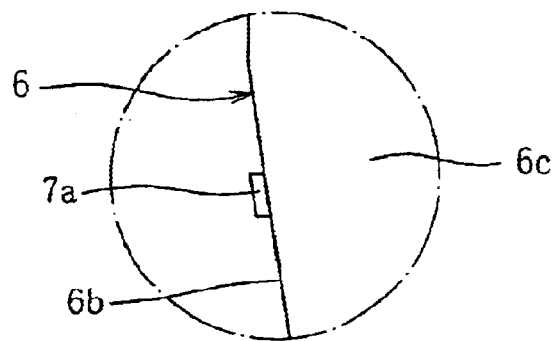
FIG. 6 is an enlarged view of portion A of FIG. 5B.

The tape fiber 7 has no particular limit to the number of the optical fibers 7a, however, the width of the plug 6 and the interval of the pinholes 6a are changed as appropriate in accordance with the number of the optical fibers 7a. As shown in FIGS. 5B and 6, the plug 6 is adapted such that the butt-joint end face 6b is ground and polished diagonally with respect to a perpendicular plane, orthogonal to the optical axis of the optical fibers 7a, so as to correspond to the auxiliary connection member 3 and the output end face 2d of the optical waveguide chip 2a. The optical fibers 7a are allowed to slightly project from the butt-joint end face 6b of the plug 6. For example, the amount of projection of the optical fibers 7a is set to 2 μm or more and preferably to 5 to 15 μm in consideration of a variation in angle caused upon grinding and polishing diagonally the butt-joint end face 6b, the auxiliary connection member 3, and the output end face 2d of the optical waveguide chip 2a.

Figure 7A:
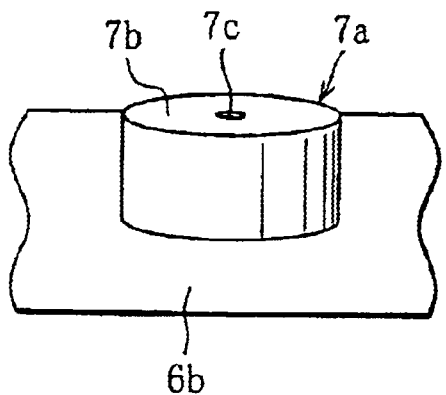
FIGS. 7A and 7B are views each showing the shape of a tip of a second optical fiber for use with the plug of FIG. 1, illustrated for comparison purposes.
Figure 7B:
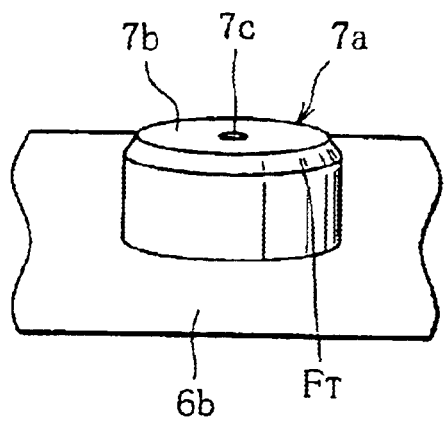
Figure 8A:
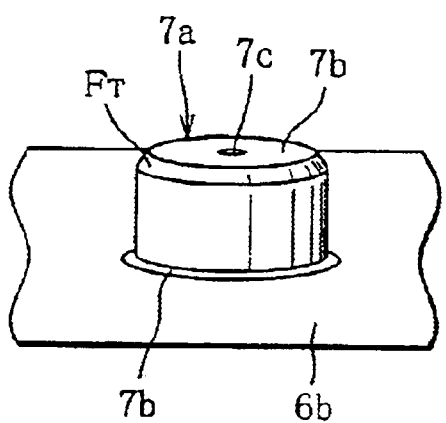
FIGS. 8A to 8D are explanatory views illustrating various shapes of the tip of the second optical fiber for use with the plug of FIG. 1.
Figure 8C:
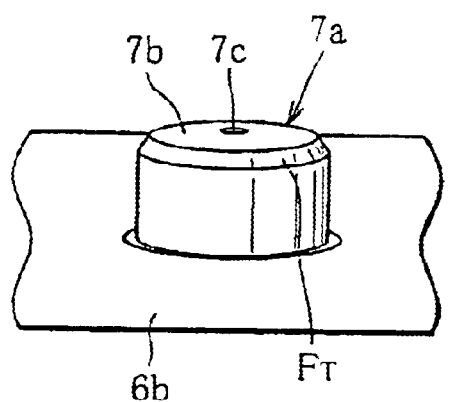
Figure 8B:
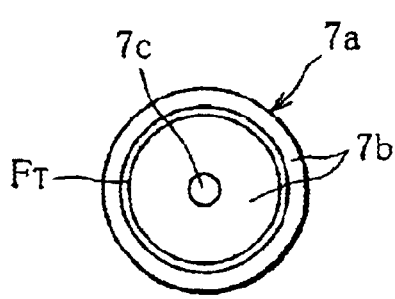
Figure 8D:
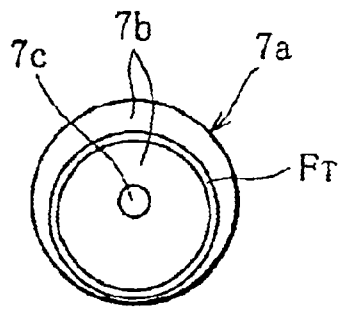

As shown in FIG. 7A, the optical fiber 7a has a cladding 7b and a core 7c, with its tip usually being formed in a cylindrical shape. However, as shown in FIG. 7B, according to the present invention, the optical fiber 7a projecting from the butt-joint end face 6b of the plug 6 has a tapered portion FT provided by chamfering the outer periphery of the tip. In addition, as shown in FIGS. 8A and 8B, the optical fiber 7a projecting from the butt-joint end face 6b, having the tapered portion FT formed on the outer periphery of the tip, may have a reduction in the diameter of the cladding 7b by grinding away the outer periphery of the cladding 7b. Alternatively, as shown in FIGS. 8C and 8D, the outer periphery of the cladding 7b may be adapted to be eccentric with respect to the center of the core 7c and reduced in diameter to project from the butt-joint end face 6b. Incidentally, FIGS. 8B and 8D illustrate the optical fiber 7a in FIGS. 8A and 8C when viewed in the direction of the optical axis.

The clamp spring 8 is a presser member for maintaining the stability of the butt-jointed connection between the optical waveguide component 2 and the plug 6, being formed by bending an elastic metal. As shown in FIG. 1, the clamp spring 8 has two spring pieces 8b on each longitudinal side of a plate-shaped member 8a. The clamp spring 8 runs between the auxiliary connection member 3 and the plug 6 to provide a pressing force (e.g., 0.49 to 49N) in the direction of the butt-joint connection between the optical waveguide component 2 and the plug 6, which are butt-jointed to each other. In this case, the clamp spring 8 provides a continuous pressing force between the optical waveguide component 2 and the plug 6. However, a clamp spring may be employed that provides a pressing force only when required.

The optical waveguide module 1 configured as described above is fabricated as follows.

First, the optical waveguide component 2 having the auxiliary connection member 3 fixedly bonded to the upper surface of the optical waveguide chip 2a on the side of the output end face 2d is butt-jointed to the plug 6 via the auxiliary connection member 3. The optical fiber array 4 is fixedly bonded to the optical waveguide component 2 on the side of the input end face 2c. At this time, the optical waveguide chip 2a is laterally aligned with the auxiliary connection member 3 by means of the alignment pin 3d interposed in between the V-grooves 3b and the V-grooves 2h. Furthermore, the optical waveguide component 2 is positioned with, and butt-jointed to, the plug 6 by means of the guide pins 3f inserted in each of the pinholes 3c of the auxiliary connection member 3.

Figure 9:
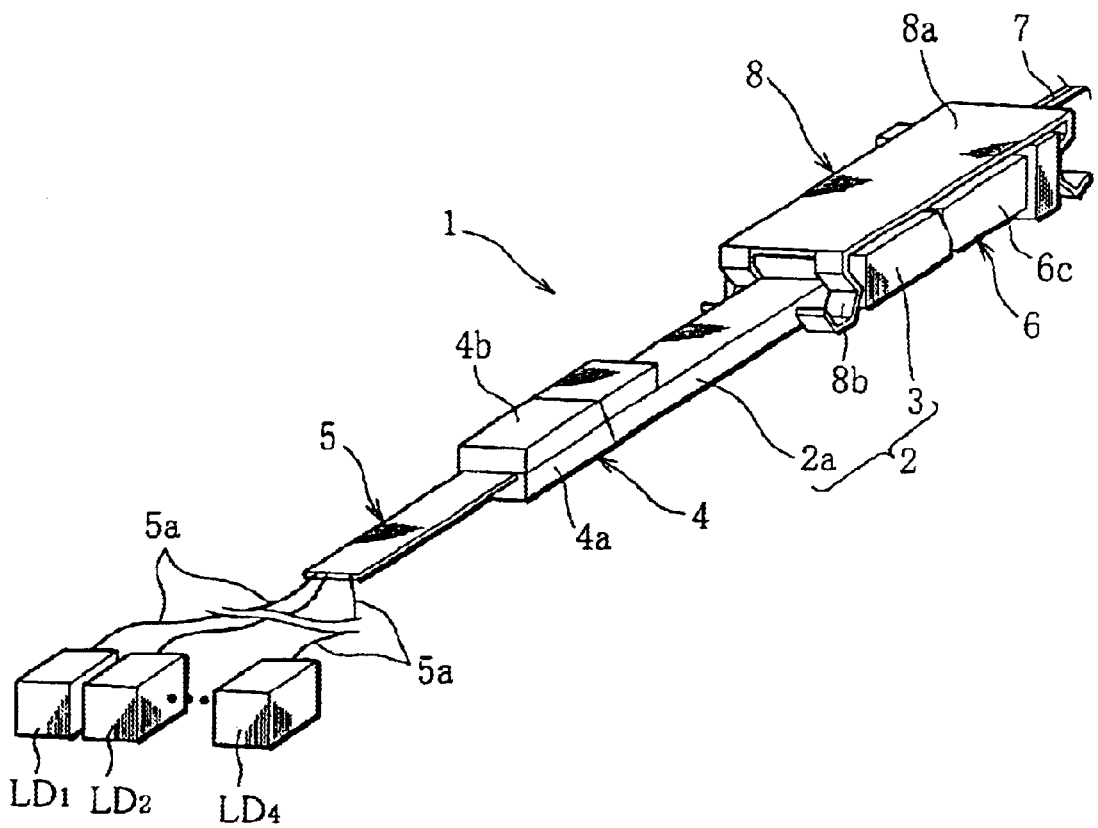
FIG. 9 is a perspective view illustrating the optical waveguide module shown in FIG. 1, where a clamp spring runs between the auxiliary connection member and the plug.

Then, as shown in FIG. 9, the clamp spring 8 is allowed to run between the auxiliary connection member 3 and the plug 6, and the respective two spring pieces 8b are brought into contact with the rear portion of the auxiliary connection member 3 and the plug 6.

This allows the optical waveguide component 2 and the plug 6 to be butt-jointed to each other, and the optical fibers 7a, projecting slightly from the butt-joint end face 6b of the plug 6, to be directly brought into contact with the optical waveguides 2b formed in the optical waveguide component 2.

In the optical waveguide module 1 shown in FIG. 9, this may cause the beams of light having different wavelengths transmitted from the semiconductor lasers LD1 to LD4 to the optical waveguide component 2 via each of the optical fibers 5a to be multiplexed by the optical waveguide component 2 into a high-power beam of light exceeding 300 mW. Nevertheless, the optical fibers 7a are in direct contact only with the optical waveguides 2b, and unlike the prior-art optical waveguide module, neither adhesive nor a refractive index matching liquid is interposed in between the optical fibers and the optical waveguides. This prevents the optical waveguide module 1 from causing the aforementioned adhesive or refractive index matching liquid to be burned or deteriorated unlike the prior-art optical waveguide module. This makes it possible to ensure a high, long-term reliability as well as manufacturing at low cost.

Furthermore, in the optical waveguide component 2, the output end face 2d including the end face of the optical waveguides 2b are ground and polished diagonally in conjunction with the auxiliary connection member 3. The plug 6 is also ground and polished diagonally so that the butt-joint end face 6b corresponds to the auxiliary connection member 3 and the output end face 2d of the optical waveguide chip 2a. This allows the optical waveguide module 1 to reduce the return loss up to 70 dB or more at the respective points where the optical fibers 7a and the optical waveguides 2b are in direct contact with each other. This makes it possible to prevent the semiconductor lasers LD1 to LD4 from damage caused by reflected light. Here, the optical waveguide component 2 and the plug 6, where the output end face 2d including the end face of the optical waveguides 2b form a perpendicular plane orthogonal to the optical axis in conjunction with the auxiliary connection member 3 and the butt-joint end face 6b, can even reduce the return loss up to 40 dB or more at the respective points where the optical fibers 7a and the optical waveguides 2b are in direct contact with each other.

Figure 10:
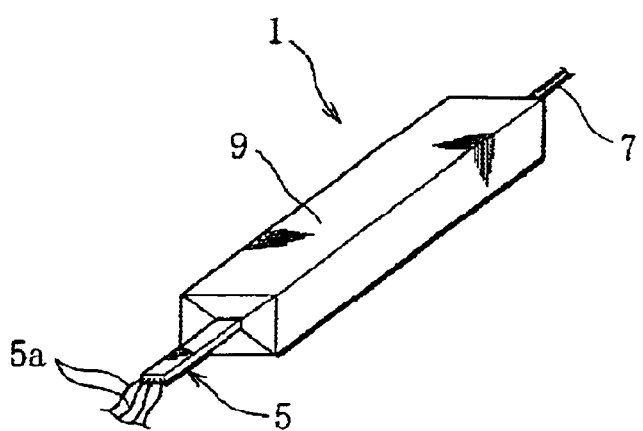
FIG. 10 is a perspective view illustrating an embodiment of a finished product housing the optical waveguide module of FIG. 9 in a package.

Then, as shown in FIG. 10, the optical waveguide component 2, the optical fiber array 4, and the plug 6 are housed, for their protection, in a package 9 to form a finished product, and thus the optical waveguide module 1 has been completely fabricated.

Incidentally, the auxiliary connection member 3, which is molded of a synthetic resin as mentioned above, would absorb moisture to slightly expand in a high-temperature high-humidity environment. For example, after the auxiliary connection member 3 is fixedly bonded to the upper surface of the optical waveguide chip 2a, the end face of the auxiliary connection member 3 is ground and polished in conjunction with the output end face 2d into a perpendicular plane, orthogonal to the optical axis of the optical waveguides 2b. Then, after having been subjected to a temperature of 85 degrees centigrade and a relative humidity of 85% for many hours, the auxiliary connection member 3 will project slightly from the output end face 2d of the optical waveguide component 2 due to expansion. The amount of the projection differs depending on the synthetic resin forming the auxiliary connection member 3, being slightly less than 1 μm at maximum.

At this time, as shown in FIG. 11, the outer periphery of the tip of the optical fibers 7a projecting from the plug 6 would be brought into contact with the end face of the auxiliary connection member 3 and the output end face 2d of the optical waveguide component 2 when the optical waveguide component 2 is butt-jointed to the plug 6 via the auxiliary connection member 3. This would happen if the tip of the optical fibers 7a projecting from the plug 6 is cylindrical in shape or large in diameter, as shown in FIG. 7A. As illustrated, this would cause the optical waveguide component 2 and the plug 6 to have a gap less than 1 μm between the optical waveguides 2b and the core 7c of the optical fibers 7a, and the gap would cause multiple reflections to occur and thereby increase transmission loss of light. In particular, transmission of high-power light exceeding 300 mW would cause a large amount of transmission loss to occur at this gap.

Furthermore, the tip of the optical fibers 7a, being cylindrical in shape as shown in FIG. 7A, would result in the following drawbacks when the optical waveguide component 2 is butt-jointed to the plug 6 via the auxiliary connection member 3. That is, as shown in FIG. 11, the upper portion of the optical fibers 7a is pressed against the auxiliary connection member 3 to cause the lower portion or an edge of the optical fibers 7a to be pressed against the output end face 2d, resulting in the production of a crack CL in the optical waveguide component 2. Such a crack CL would grow further in a high-temperature high-humidity environment, causing an increase in transmission loss of light.

For example, a Belcore-GR1209-compliant high-temperature high-humidity test was conducted (at a temperature of 85 degrees centigrade and a relative humidity of 85% for two weeks) on a sample of the optical waveguide module 1 shown in FIG. 9, in which such a crack CL occurred. That is, the time-dependent transmission loss of the light that is emitted from the semiconductor laser LD1 and then transmitted through an input port of the optical waveguide component 2 to the optical fibers 7a of the plug 6 was monitored using only the optical waveguide component 2, the optical fiber array 4, and the plug 6 of the sample of the optical waveguide module 1 shown in FIG. 9. The result of the variation in transmission loss (dB) monitored is shown in FIG. 12.

Figure 12:
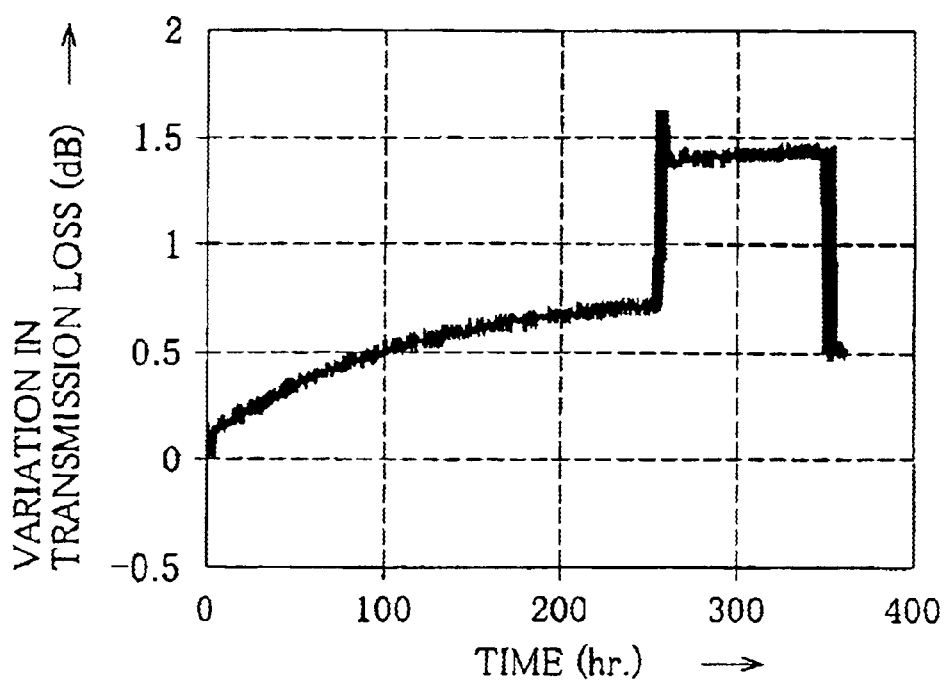
FIG. 12 shows the transmission loss property of a sample of the optical waveguide module having the drawback shown in FIG. 11, provided by monitoring the time-dependent variations in transmission loss of the light emitted from semiconductor lasers and transmitted to the optical fiber of the plug via the optical waveguide component.

Referring to FIG. 12, a gradual increase in transmission loss observed immediately after the monitoring had been initiated corresponds to the increase in transmission loss caused by the gap, resulting from the absorption of moisture by the auxiliary connection member 3, between the optical waveguides 2b and the core 7c of the optical fibers 7a. In addition, a step-wise increase in transmission loss from about 0.7 dB to about 1.6 dB, found 260 hours after the commencement of the test, corresponds to the occurrence of the crack CL in the optical waveguide component 2. Furthermore, there exists an increase of 0.5 dB in transmission loss at the end of the test. Since the increase in transmission loss remained, the transmission loss could not be restored to its original level found before the initiation of the test even after the temperature and humidity were brought back to normal conditions.

In this regard, as described above, the optical waveguide module 1, according to the present invention, allows the outer periphery of the tip of the optical fibers 7a to be first chamfered into a tapered portion FT, as shown in FIG. 7B, in order to prevent the lower part acting as an edge of the optical fibers 7a from producing the crack CL on the output end face 2d of the optical waveguide component 2. Secondly, as shown in FIGS. 8A and 8B, the tapered portion FT is formed on the outer periphery of the tip of the optical fibers 7a, and the outer periphery of the tip of the cladding 7b is ground and polished to reduce the cladding 7b in diameter. Alternatively, as shown in FIGS. 8C and 8D, the outer periphery of the cladding 7b is formed to be eccentric with respect to the center of the core 7c and ground and polished to be reduced in diameter.

For example, with the outer periphery of the cladding 7b being ground and polished as shown in FIGS. 8C and 8D, the optical fibers 7a are allowed into the lower part of the auxiliary connection member 3, which has been expanded to protrude slightly from the output end face 2d, to directly contact with the respective optical waveguides 2b of the optical waveguide component 2. Thus, no gap will be produced between the optical waveguides 2b and the core 7c of the optical fibers 7a in the optical waveguide module 1 which is fabricated as described above. Incidentally, for the sake of simplicity, FIGS. 11 and 13 illustrate the plug 6 in which the butt-joint end face 6b has a perpendicular plane orthogonal to the optical axis of the optical fibers 7a.

As described above, the plug 6 is adapted to allow the optical fibers 7a to project slightly from the butt-joint end face 6b as well as the outer periphery of the tip of the optical fibers 7a being chamfered or the cladding 7b is ground and polished and thereby reduced in diameter. This will prevent the optical waveguide component 2 from being cracked due to the direct contact of the optical waveguides 2b with the core 7c of the optical fibers 7a. It will also prevent an increase in transmission loss of light even when the auxiliary connection member 3 absorbs moisture in a high-temperature high-humidity environment and thereby expands to slightly protrude from the output end face 2d of the optical waveguide component 2.

Figure 14:
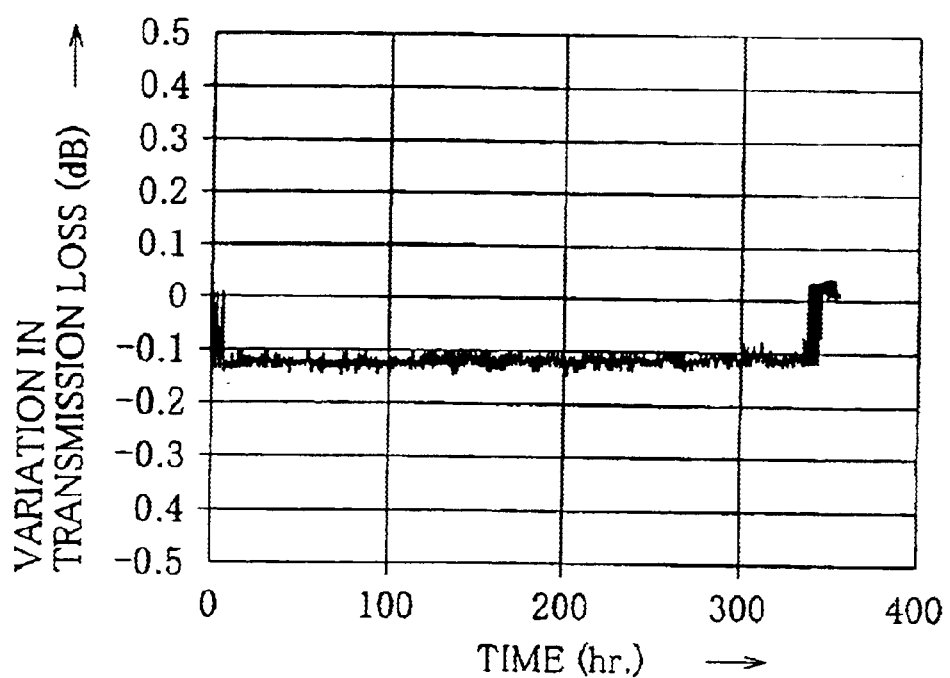
FIG. 14 shows the transmission loss property of an optical waveguide module with an optical fiber having the structure shown in FIG. 13, provided by monitoring the time-dependent variations in transmission loss of the light emitted from a semiconductor laser and transmitted to the optical fiber of the plug via the optical waveguide component.

FIG. 14 shows the result of the variation in transmission loss of light monitored in the same way as in FIG. 12 and provided through the Belcore-GR1209-compliant high-temperature high-humidity test conducted (at a temperature of 85 degrees centigrade and a relative humidity of 85% for two weeks) on the optical waveguide module 1 with the optical fibers 7a of the plug 6 being ground and polished as described above. As can be seen clearly from FIG. 14, neither gradual increase nor step-wise increase in transmission loss was found unlike the result of the test in FIG. 12, and the residual loss was less than 0.1 dB after the end of the test.

As is evident from the above explanation the present invention makes it possible to provide the optical waveguide module 1 which has a variation of 0.2 dB or less in transmission loss after the Belcore-GR1221-compliant long-term high-temperature high-humidity test (conducted at a temperature of 85 degrees centigrade and a relative humidity of 85% for 5000 hours), which has optical waveguides integrated at high densities, which has improved resistance to environment, and which has high reliability.

It is also known that the adhesive layer 3e for fixedly bonding the auxiliary connection member 3 to the optical waveguide chip 2a absorbs moisture to expand in a high-temperature high-humidity environment and tends to thereby extend toward the output end face 2d from between the optical waveguide component 2 and the auxiliary connection member 3. Nevertheless, the adhesive layer 3e has a low rigidity and therefore the thickness is maintained, for example, at 20 $\mu$m or less. This would prevent the expanded adhesive layer 3e from extending in between the optical waveguide component 2 and the optical fibers 7a to form a gap between the optical waveguides 2b and the core 7c of the optical fibers 7a.

Figure 15A:
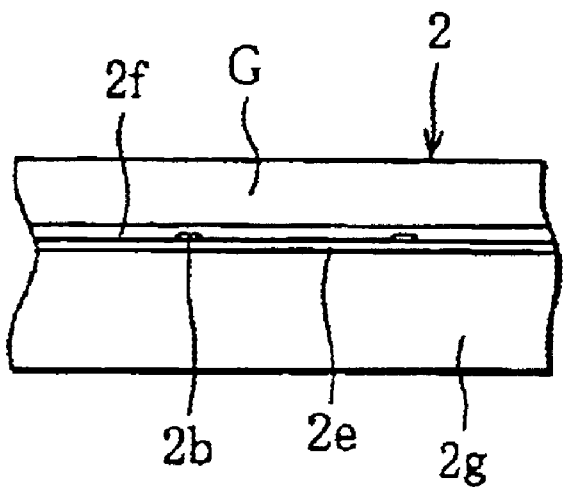
FIGS. 15A and 15B are front views illustrating a modified example of the optical waveguide module according to the present invention.
Figure 15B:
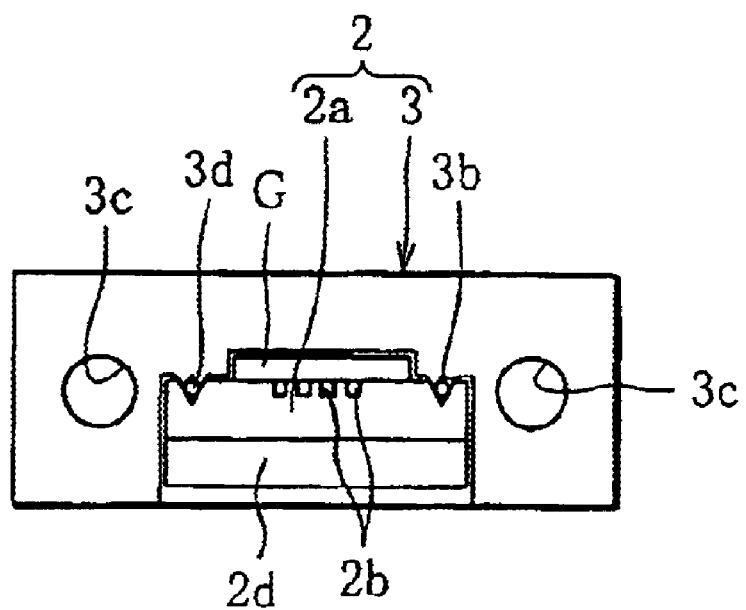
Figure 16:
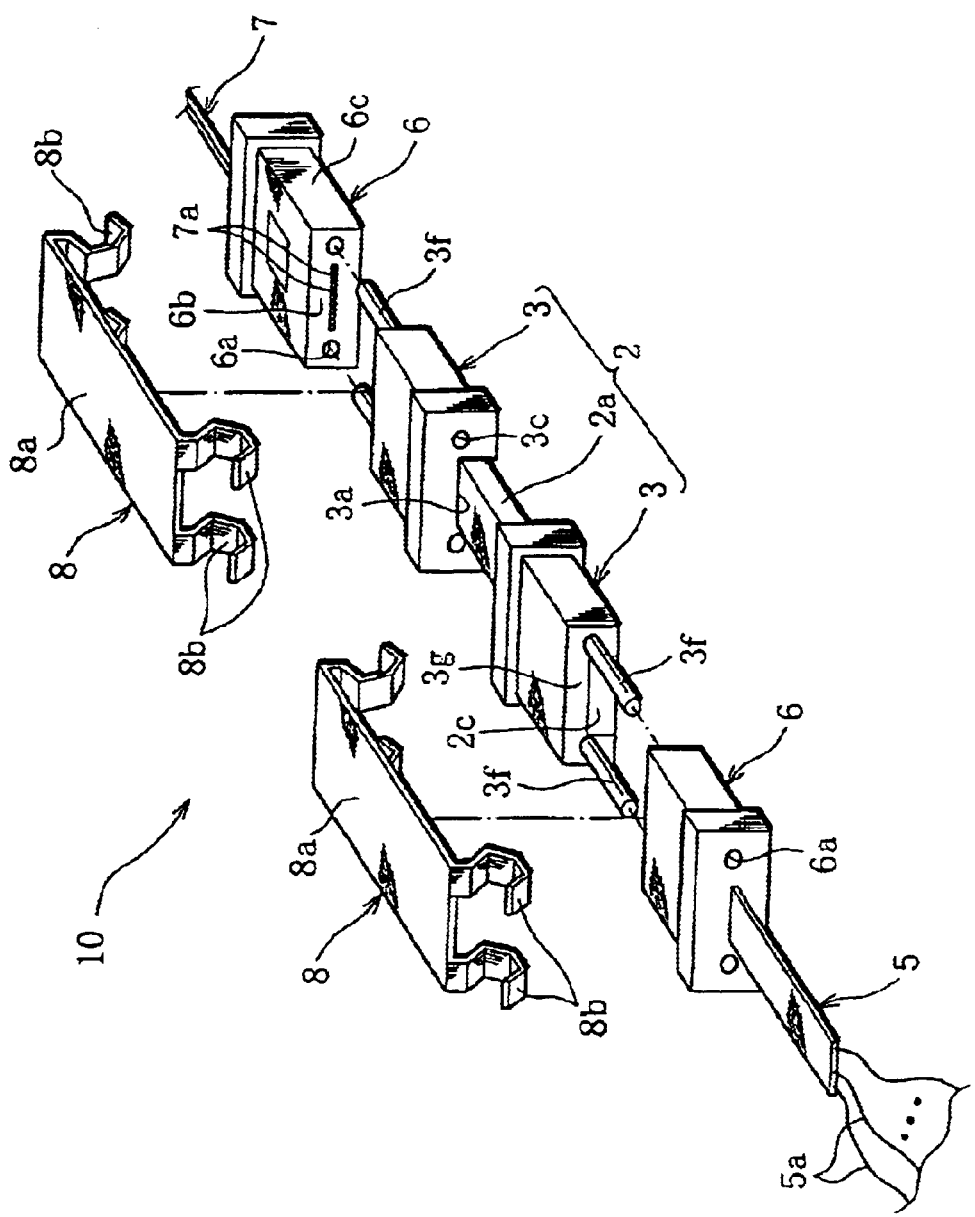
FIG. 16 is a perspective view illustrating another embodiment of the optical waveguide module according to the present invention.

Furthermore, in order to prevent the aforementioned adhesive layer 3e from extending in between the optical waveguide component 2 and the optical fibers 7a, the optical waveguide component 2 may be adapted to have a thick upper cladding layer 2f in the upper portion of the optical waveguides 2b or a glass plate G may be ultrasonically fusion-bonded onto the upper cladding layer 2f as shown in FIG. 15A. Alternatively, a glass plate G may be disposed in between the optical waveguide chip 2a and the auxiliary connection member 3 as a spacer, as shown in FIG. 15B. A mold release agent or the like may be applied as a spacer between the optical waveguide chip 2a and the auxiliary connection member 3 when the auxiliary connection member 3 is fixedly bonded to the optical waveguide chip 2a, and then the hardened adhesive is removed to prevent the aforementioned extension of the adhesive layer 3e.

To allow a high-power beam of light exceeding 300 mW to be inputted from the input end face to the optical waveguides 2b of the optical waveguide component 2 in the optical waveguide module according to the present invention, the input end face has to be configured corresponding to the high-power beam of light. In this case, like an optical waveguide module 10 shown in FIG. 16, the auxiliary connection members 3 may be fixedly bonded to both input and output end faces (not shown) of the optical waveguide chip 2a. Then the plugs 6 may be connected to the optical waveguide component 2 via each of the auxiliary connection members 3 to allow the clamp spring 8 to run between each auxiliary connection member 3 and plug 6.

In each of the optical waveguide modules, described below, according to other embodiments, their components that are the same as those of the optical waveguide module 1 are given the same reference numbers in the drawing and will not be described repeatedly.

Figure 17:
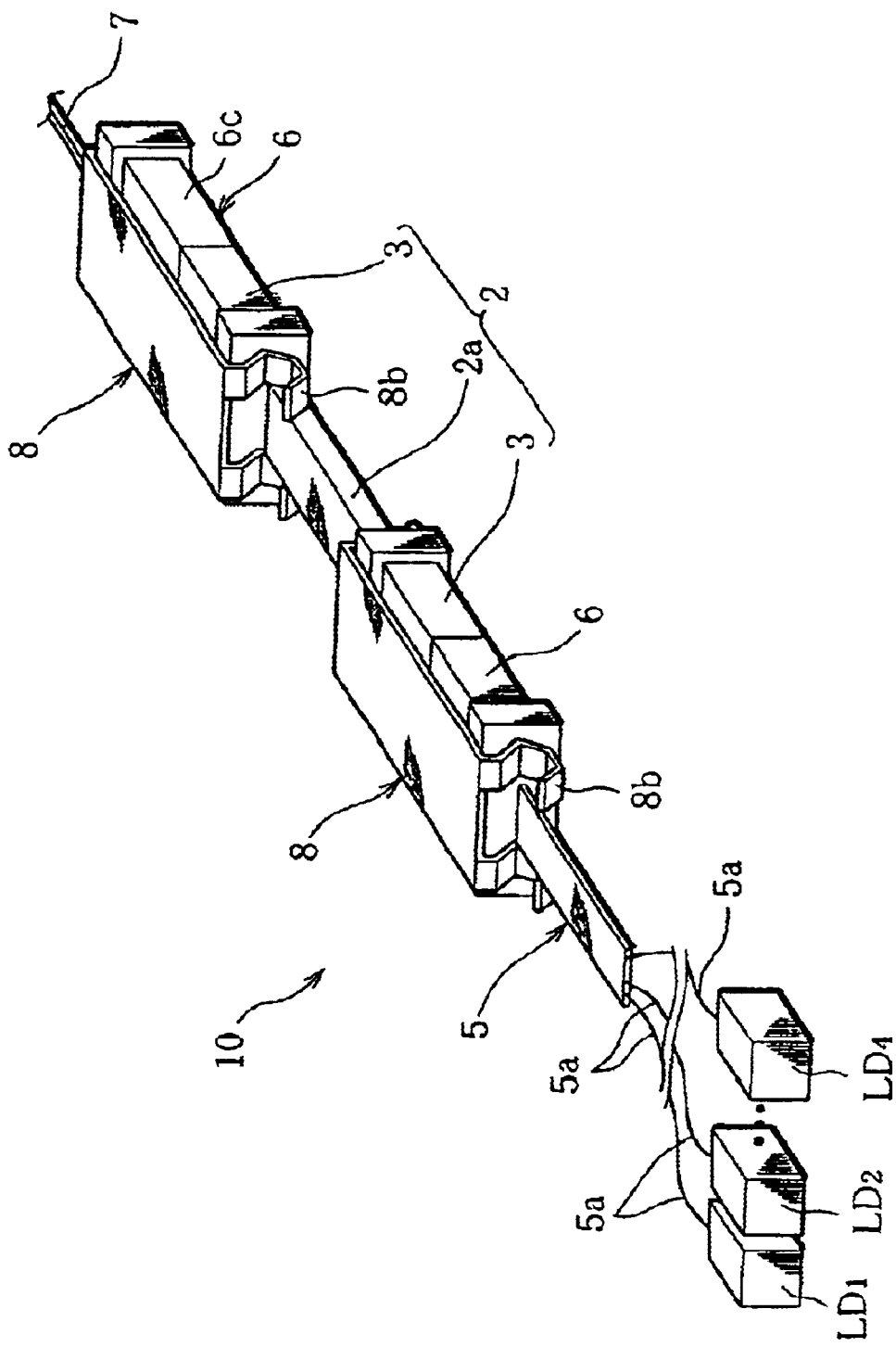
FIG. 17 is a perspective view illustrating the optical waveguide module shown in FIG. 16, where clamp springs run between the optical waveguide component, the auxiliary connection member of the plug, and the plug, which are butt-jointed to each other via the auxiliary connection member.
Figure 18:
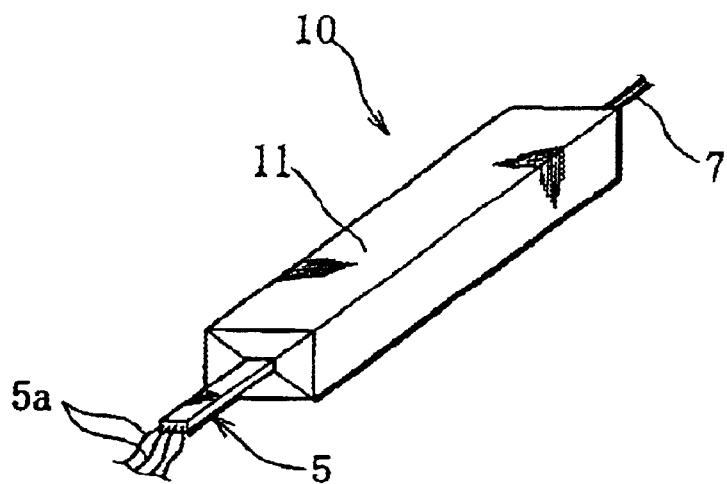
FIG. 18 is a perspective view illustrating a finished product housing the optical waveguide module of FIG. 17 in a package.

At this time, as shown in FIG. 17, the plug 6 to be connected to the input end face of the optical waveguide component 2 is attached to an end of the tape fiber 5, while the end of each of the optical fibers 5a extending outwardly from the other end of the tape fiber 5 is coupled to the semiconductor lasers LD1 to LD4 acting as a light source for emitting beams of light having different wavelengths. Then, like the optical waveguide module 1, as shown in FIG. 18, the optical waveguide component 2, the optical fiber array 4, and the plugs 6 are housed, for their protection, in a package 11 into a finished product of the optical waveguide module 10.

Therefore, like the optical waveguide module 1, the optical waveguide module 10 is also adapted such that the optical fibers 7a, slightly projecting from the butt-joint end face 6b of the plug 6, directly contacts with the optical waveguides 2b formed in the optical waveguide component 2 when the optical waveguide component 2 is butt-jointed to the plug 6 via the auxiliary connection member 3.

Suppose that the beams of light having different wavelengths transmitted from the semiconductor lasers LD1 to LD4 to the optical waveguide component 2 via each of the optical fibers 5a are multiplexed by the optical waveguide component 2 into a high-power beam of light exceeding 300 mW. Even in this case, the optical fibers 7a are in direct contact only with the optical waveguides 2b, and neither adhesive nor a refractive index matching liquid are present on the input and output end faces, thus never causing them to burn or deteriorate.

Figure 19:
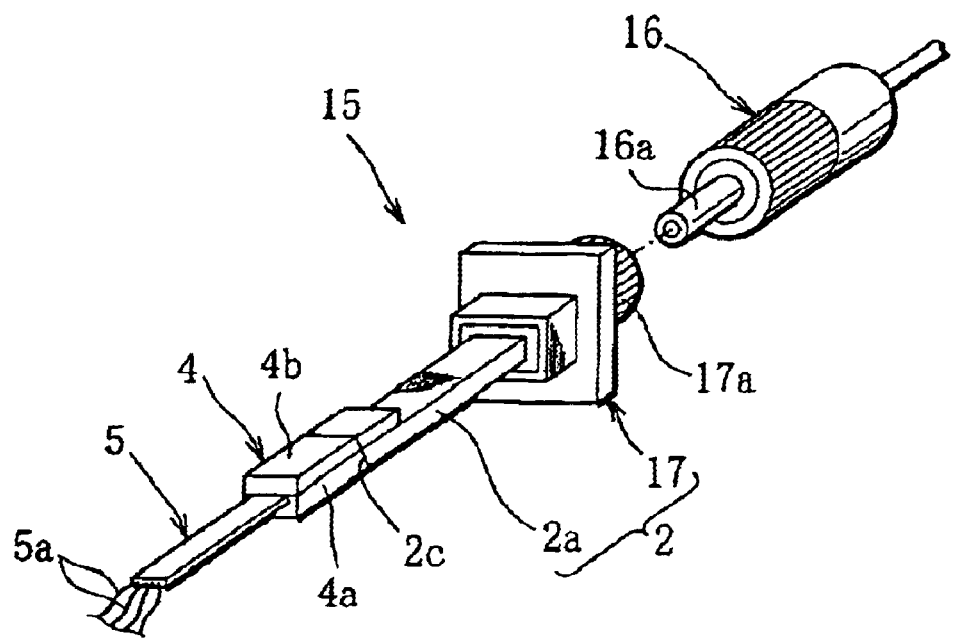
FIG. 19 is a perspective view illustrating a further embodiment of the optical waveguide module according to the present invention.

On the other hand, the optical waveguide module, according to the present invention, may be configured, like an optical waveguide module 15 shown in FIG. 19, in a manner such that a single-fiber connector plug 16 is connected to the side of the output end face 2d of the optical waveguide component 2 via an auxiliary connection member 17.

Figure 20:
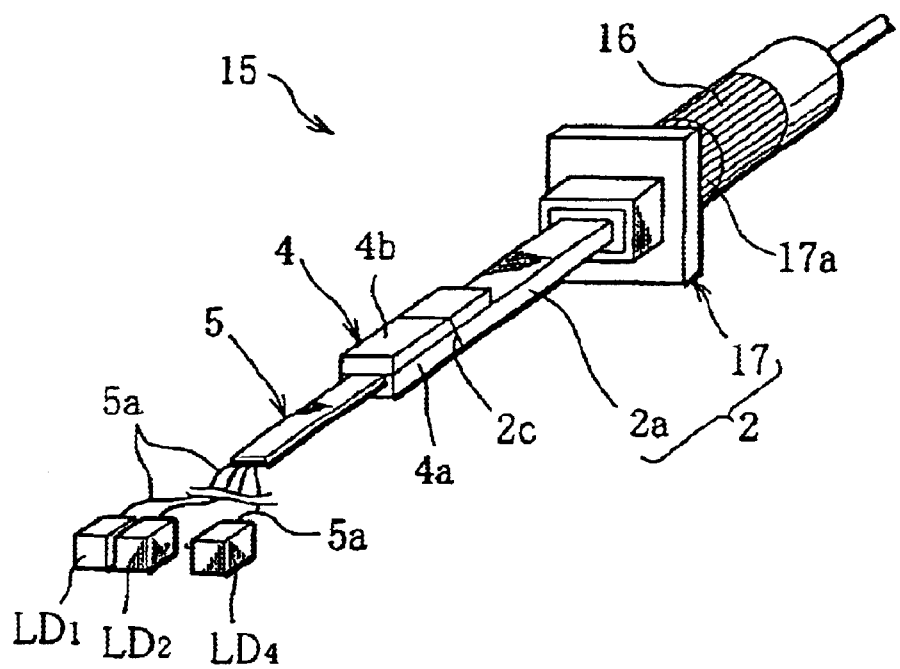
FIG. 20 is a perspective view illustrating the optical waveguide module shown in FIG. 19, where an optical waveguide component and a plug are butt-jointed to each other via an auxiliary connection member.
Figure 21:
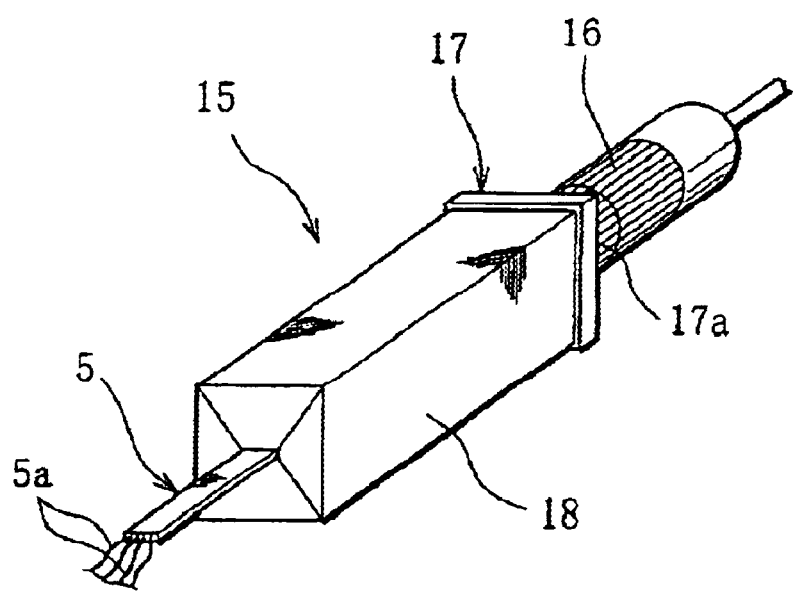
FIG. 21 is a perspective view illustrating a finished product housing the optical waveguide module of FIG. 20 in a package.

In the aforementioned configuration, the plug 16 has a single-fiber ferrule 16a and an optical fiber 16b, and a housing 16c houses a spring (not shown) for pressing the ferrule 16a in the direction of the connection between the optical waveguide chip 2a and the optical fiber 16b. On the other hand, the auxiliary connection member 17 is provided with a single-fiber adapter 17a acting as an interface upon being connected to a single-fiber connector such as an FC connector, SC connector, or MU connector. The optical waveguide component 2 is adapted such that the optical fiber array 4 is fixedly bonded with adhesive to the upper surface of the optical waveguide component 2 on the side of the input end face 2c. As shown in FIG. 20, the tape fiber 5 is connected at an end with the optical fiber array 4 and at the other end with the optical fibers 5a. The semiconductor lasers LD1 to LD4, acting as the light source for emitting beams of light having different wavelengths, are coupled to the end of each of the optical fibers 5a extending outwardly from the other end of the tape fiber 5. Then, like the optical waveguide module 1, as shown in FIG. 21, the optical waveguide component 2, the optical fiber array 4, and the plug 6 are housed, for their protection, in a package 18 as the finished product of the optical waveguide module 15.

Therefore, since the optical fibers 7a, slightly projecting from the butt-joint end face 6b of the plug 6, directly contact with the optical waveguides 2b formed in the optical waveguide component 2, the optical waveguide module 15 can provide the same effect as that of the optical waveguide module 10.

Figure 22:
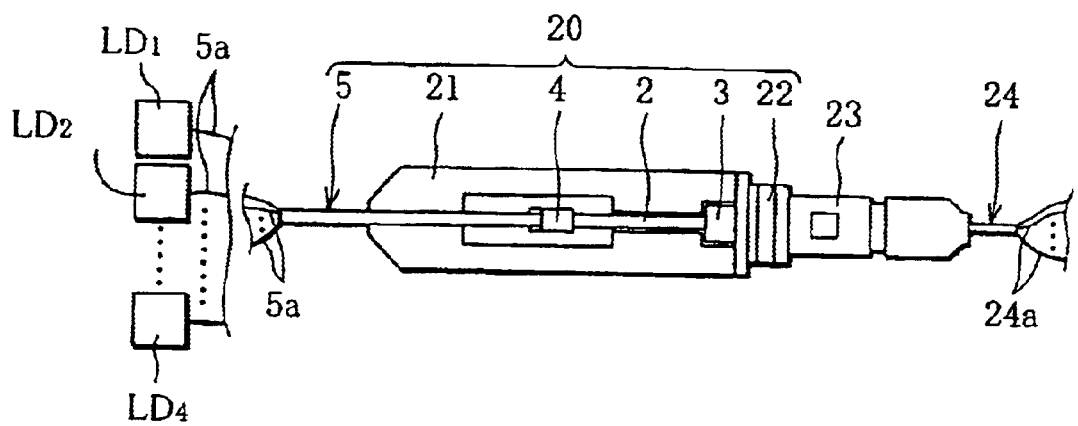
FIG. 22 is a perspective view illustrating another embodiment of the optical waveguide module according to the present invention.

Furthermore, like an optical waveguide module 20 shown in FIG. 22, the optical waveguide module, according to the present invention, may employ a multi-fiber push-on (MPO) connector plug as an array member.

That is, the optical waveguide module 20 is adapted such that the optical waveguide component 2 connected with the auxiliary connection member 3 and the optical fiber array 4 are housed in a housing 21, and an MPO receptacle 22 is attached to the output side of the housing 21. The optical waveguide module 20 allows a plug 23 to be detachedly attached via the MPO receptacle 22.

In the aforementioned configuration, like the plug 6, the plug 23 has a ferrule (not shown) to be attached to an end of a tape fiber 24 having a plurality of optical fibers 24a acting as the second optical fibers, and pinholes (not shown) are formed on both lateral sides of the plug 23. Like the plug 6, the plug 23 is adapted such that its butt-joint end face (not shown) is ground and polished diagonally with respect to a perpendicular plane, orthogonal to the optical axis of the optical fibers 24a, so as to correspond to the auxiliary connection member 3 and the output end face 2d of the optical waveguide component 2. The optical fibers 24a are allowed to slightly project from the butt-joint end face of the plug 23. The plug 23 is positioned with and butt-jointed to the auxiliary connection member 3, and therefore the optical waveguide component 2, by means of two guide pins 3f of the auxiliary connection member 3.

A tape fiber 24 is connected with semiconductor lasers LD1 to LD4 serving as a light source for emitting beams of light having different wavelengths to the end.

Therefore, like the optical waveguide module 1, the optical waveguide module 20 is also adapted such that the optical fibers 24a, slightly projecting from the butt-joint end face of the plug 23, directly contacts with the optical waveguides 2b formed in the optical waveguide component 2 when the optical waveguide component 2 is butt-jointed to the plug 23 via the auxiliary connection member 3.

Suppose that the beams of light having different wavelengths transmitted from the semiconductor lasers LD1 to LD4 to the optical waveguide component 2 via each of the optical fibers 24a are multiplexed by the optical waveguide component 2, for example, into a high-power beam of light exceeding 300 mW. Even in this case, the optical fibers 24a are in direct contact only with the optical waveguides 2b, and neither adhesive nor a refractive index matching liquid are present on the input and output end faces. Therefore, neither adhesive nor a refractive index matching liquid will burn or deteriorate in the optical waveguide module 20.

Figure 23:
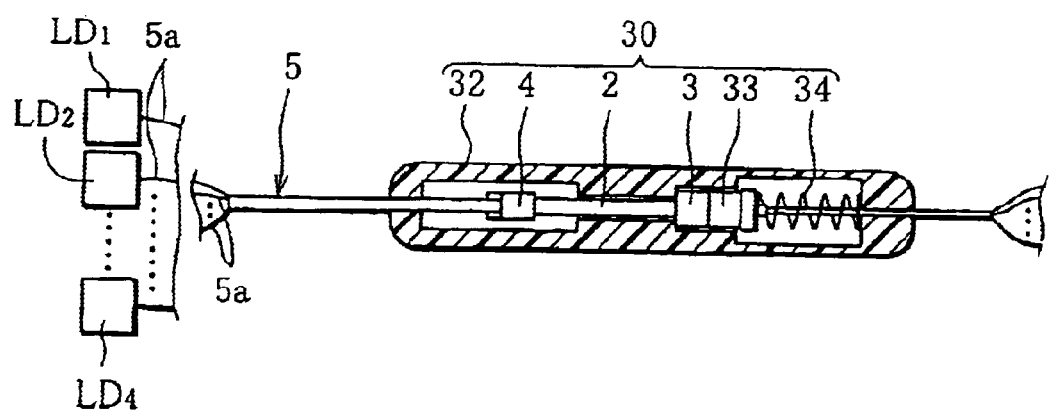
FIG. 23 is a perspective view illustrating a further embodiment of the optical waveguide module according to the present invention.

Furthermore, like an optical waveguide module 30 shown in FIG. 23, the optical waveguide component 2 connected with the auxiliary connection member 3 and the optical fiber array 4 are housed in a housing 32. In addition, the optical waveguide module 30 is configured such that an MT connector plug 33 is housed in the housing 32 at the output side in conjunction with a spring 34.

Therefore, since the core of optical fibers 34a slightly projecting from the butt-joint end face (not shown) of the MT connector plug 33 directly contacts with the optical waveguides 2b formed in the optical waveguide component 2, the optical waveguide module 30 can provide the same effect as that of the optical waveguide module 20.

What is claimed is:

1. An optical waveguide module comprising
a first array member with a plurality of optical fibers having ends attached to a first connection member,
a second array member with at least one optical fiber having an end attached to a second connection member, and
an optical waveguide chip having an input and output end face and an optical waveguide for multiplexing a plurality of optical signals having different wavelengths inputted from a plurality of input ports to output a resulting optical signal from at least one output port,
said optical waveguide module wherein
said first array member is bonded with an adhesive to said input end face of said optical waveguide chip,
an auxiliary connection member is attached to an output end portion of said optical waveguide chip,
said second connection member is connected to said auxiliary connection member,
said second array member is coupled to said output end face of said optical waveguide chip via said second connection member and said auxiliary connection member, a presser member for pressing said auxiliary connection member and said second array member in a direction of connection is disposed across said auxiliary connection member and said second array member, and a core of said optical waveguide exposed from said output end face of said optical waveguide chip is in direct contact with a core of said optical fiber exposed from an end of said second array member.

2. The optical waveguide module according to claim 1, wherein said presser member is disposed across connections between said optical waveguide chip and said first array member and between said optical waveguide chip and said second array member.

3. The optical waveguide module according to claim 1, wherein an optical signal passing through where the core of said optical waveguide is in direct contact with the core of said optical fiber has a maximum power of 300 mW or more per port.

4. The optical waveguide module according to claim 1, wherein an optical signal passing through where the core of said optical waveguide is in direct contact with the core of said optical fiber has a maximum power of 300 mW or more per port at said input end face, and an optical signal passing through where the core of said optical waveguide is in direct contact with the core of said optical fiber has a maximum power of 300 mW or more per port at said output end face.

5. The optical waveguide module according to claim 1, wherein said auxiliary connection member is bonded to a circumference of the output end portion of said optical waveguide chip by way of an adhesive layer having a thickness of 20 $\mu$m or less.

6. An optical waveguide module comprising:

an optical fiber having an axis and an end portion, a first connection member attached to the end portion of said fiber, said first connection member having a first end face, wherein a tip of the end portion is projected from said first end face, an optical waveguide chip aligned with said fiber in a connecting direction parallel to the axis of said fiber, said chip including a second end face opposite the first end face of said first connection member, a mount surface parallel to the connecting direction, and an optical waveguide extending under the mount surface, the optical waveguide having a port exposed in the second end face of said chip and brought into contact with the projecting tip of said fiber, a second connection member mounted on the mount surface of said chip, said second connection member being made of synthetic resin and cooperating with said first connection member to align said chip with said fiber, said second connection member having a third end face located at the side of the second end surface, and a press member for bringing the port of said chip into contact with the projecting tip of said fiber by pressing at least one of said optical waveguide chip and optical fiber in the connecting direction, wherein the projecting tip of said fiber and the third end face of said second connection member are separated from each other in a direction perpendicular to the connecting direction.

7. The optical waveguide module according to claim 6, wherein an outer peripheral edge of the projecting tip of said fiber is cut away.

8. The optical waveguide module according to claim 7, wherein the projecting tip of said optical fiber has a diameter smaller than a diameter of the other portion of said fiber.

9. The optical waveguide module according to claim 8, wherein cladding in the projecting tip of said fiber has thickness varied in a circumferential direction of a fiber core covered therewith.

10. The optical waveguide module according to claim 7, wherein cladding in the projecting tip of said fiber has thickness varied in a circumferential direction of a fiber core covered therewith.

11. The optical waveguide module according to claim 6, wherein the projecting tip of said optical fiber has a diameter smaller than a diameter of the other portion of said fiber.

12. The optical waveguide module according to claim 11, wherein cladding in the projecting tip of said fiber has thickness varied in a circumferential direction of a fiber core covered therewith.

13. The optical waveguide module according to claim 6, wherein cladding in the projecting tip of said fiber has thickness varied in a circumferential direction of a fiber core covered therewith.

14. The optical waveguide module according to claim 6, wherein a glass layer is interposed between said second connection member and said optical waveguide chip.

15. The optical waveguide module according to claim 7, wherein a glass layer is interposed between said second connection member and said optical waveguide chip.

16. The optical waveguide module according to claim 6, wherein the optical waveguide of said chip is for multiplexing lights and providing said fiber with the multiplexed lights through the port thereof.

17. The optical waveguide module according to claim 16, wherein the multiplexed lights have a maximum power of 300 mW or more.

* * * * *